US012596986B2

(12) United States Patent
Pedawi

(10) Patent No.: US 12,596,986 B2
(45) Date of Patent: *Apr. 7, 2026

(54) GLOBAL ADDRESS SYSTEM AND METHOD

(71) Applicant: Sarwar Pedawi, Dubai (AE)

(72) Inventor: Sarwar Pedawi, Dubai (AE)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,531

(22) Filed: Mar. 29, 2023

(65) Prior Publication Data

US 2023/0237608 A1 Jul. 27, 2023

Related U.S. Application Data

(63) Continuation of application No. 18/179,618, filed on Mar. 7, 2023, which is a continuation of application No. 17/750,073, filed on May 20, 2022, now Pat. No. 11,636,564, which is a continuation of application No. 16/055,775, filed on Aug. 6, 2018, now abandoned, which is a continuation-in-part of
(Continued)

(51) Int. Cl.

| | |
|---|---|
| *G06Q 50/28* | (2012.01) |
| *G06F 16/29* | (2019.01) |
| *G06K 19/06* | (2006.01) |
| *G06Q 10/08* | (2024.01) |
| *G06Q 10/083* | (2023.01) |

(52) U.S. Cl.
CPC ............. *G06Q 50/28* (2013.01); *G06F 16/29* (2019.01); *G06K 19/06037* (2013.01); *G06Q 10/083* (2013.01)

(58) Field of Classification Search
None
See application file for complete search history.

(56) References Cited

U.S. PATENT DOCUMENTS

| | | | |
|---|---|---|---|
| 6,480,758 | B2 | 11/2002 | Stevens |
| 6,725,127 | B2 | 4/2004 | Stevens |
| 7,797,104 | B2 | 9/2010 | Finn et al. |

(Continued)

FOREIGN PATENT DOCUMENTS

| | | |
|---|---|---|
| CN | 103544582 A | 1/2014 |
| CN | 106557582 A | 4/2017 |

(Continued)

OTHER PUBLICATIONS

NPL, Galanis, Athanasios, Evaluation of the pedestrian infrastructure using walkability indicators, WSEAS Transactions on Enviroment and Development, Issue 12, vol. 7, (http://www.wseas.us/e-library/transactions/environment/2011/54-653.pdf) (Dec. 2011 ) (Hereinafter "Galanis").*

(Continued)

*Primary Examiner* — Jean Paul Cass
(74) *Attorney, Agent, or Firm* — STERNE, KESSLER, GOLDSTEIN & FOX P.L.L.C.

(57) ABSTRACT

This disclosure relates to a system, method, and computer-readable device configured to receive demographic and geographical information and create a unique global address therefrom. For example, the system comprises at least one processor configured to receive account information describing the remote user and global location data describing a remote location, validate the received information and data, determine navigational data, create a location code, and send the location code to a remote device.

20 Claims, 10 Drawing Sheets

Related U.S. Application Data application No. 15/461,100, filed on Mar. 16, 2017, now abandoned.

(56) References Cited

U.S. PATENT DOCUMENTS

| | | | |
|---|---|---|---|
| 8,655,487 | B2 | 2/2014 | Hurley et al. |
| 8,725,407 | B2 | 5/2014 | Hurley et al. |
| 8,751,153 | B2 | 6/2014 | Hurley et al. |
| 8,798,380 | B1 | 8/2014 | Windmueller et al. |
| 8,838,375 | B2 * | 9/2014 | Yang ................. G01C 21/3667 |
| | | | 701/438 |
| 9,074,899 | B2 * | 7/2015 | Yang .................... G01C 21/206 |
| 9,576,478 | B2 * | 2/2017 | Stenneth ............... G08G 1/127 |
| 10,606,963 | B2 | 3/2020 | Tiwari et al. |
| 10,650,236 | B2 | 5/2020 | Xia et al. |
| 10,769,741 | B2 * | 9/2020 | Braun .................... H04W 4/90 |
| 11,441,951 | B2 * | 9/2022 | Solheim ............... G01J 5/0802 |
| 11,636,564 | B2 | 4/2023 | Pedawi |
| 2004/0089727 | A1 | 5/2004 | Baharav et al. |
| 2005/0107948 | A1 | 5/2005 | Catalinotto |
| 2007/0073524 | A1 | 3/2007 | Song |
| 2007/0218900 | A1 | 9/2007 | Abhyanker |
| 2008/0114541 | A1 | 5/2008 | Shintani et al. |
| 2008/0262717 | A1 | 10/2008 | Ettinger |
| 2008/0319646 | A1 * | 12/2008 | Hopkins ................ G01C 21/26 |
| | | | 701/533 |
| 2009/0234570 | A1 | 9/2009 | Sever |
| 2009/0238042 | A1 * | 9/2009 | Hawkinson ........ G01C 21/1654 |
| | | | 367/131 |
| 2010/0100233 | A1 | 4/2010 | Lu |
| 2010/0153291 | A1 | 6/2010 | Jimenez et al. |
| 2010/0306287 | A1 | 12/2010 | Raphaeil |
| 2012/0317152 | A1 | 12/2012 | Ross et al. |
| 2013/0013204 | A1 | 1/2013 | Kazama et al. |
| 2013/0159207 | A1 | 6/2013 | Sears et al. |
| 2014/0108556 | A1 | 4/2014 | Abhyanker |
| 2014/0237062 | A1 | 8/2014 | Abhyanker |
| 2015/0006005 | A1 * | 1/2015 | Yu .......................... G05D 1/667 |
| | | | 701/22 |
| 2015/0294261 | A1 | 10/2015 | Adell |
| 2016/0092456 | A1 | 3/2016 | Bonnell et al. |
| 2017/0011343 | A1 | 1/2017 | Stenneth et al. |
| 2017/0046657 | A1 | 2/2017 | Allen |
| 2017/0140478 | A1 | 5/2017 | Freeman et al. |
| 2017/0193428 | A1 | 7/2017 | Abrams et al. |
| 2018/0268369 | A1 | 9/2018 | Pedawi |
| 2018/0350021 | A1 | 12/2018 | Pedawi |
| 2019/0189135 | A1 * | 6/2019 | Ananthabhotla ....... G10L 19/26 |
| 2021/0406709 | A1 * | 12/2021 | Begleiter ................. G06N 5/01 |
| 2022/0156636 | A1 * | 5/2022 | Albrecht ............. G01C 13/002 |
| 2024/0135303 | A1 | 4/2024 | Pedawi |

FOREIGN PATENT DOCUMENTS

| | | | |
|---|---|---|---|
| CN | 106997466 A | 8/2017 | |
| CN | 107667366 A | 2/2018 | |
| CN | 108171220 A | 6/2018 | |
| EP | 1291816 A1 | 3/2003 | |
| EP | 2273337 A2 * | 1/2011 | ......... G06K 9/00798 |
| JP | 2001175983 A | 6/2001 | |
| JP | 2005084064 A * | 3/2005 | |
| KR | 20120087269 A | 8/2012 | |
| KR | 20160057038 A | 5/2016 | |
| KR | 20170055011 A | 5/2017 | |
| WO | WO-9934346 A1 | 7/1999 | |
| WO | WO-2017024308 A1 | 2/2017 | |
| WO | WO-2018116154 A1 | 6/2018 | |

OTHER PUBLICATIONS

Rundel, Michael, 'What3Words' Wants to Replace Postcodes With Words—for the Entire Globe, Huffington Post United Kingdom (https://www.huffingtonpost.co.uk/2013/07/02/what3words _n_3532122 -html) (2013).*

"After Dubai, 'Makani' app to map Ajman, Sharjah, Abu Dhabi," Emirates 24/7, Sep. 1, 2020, available at: https//:www.emirates247. com/news/emirates/after-dubai-makani-app-to-map-ajman-sharjah-abu-dhabi-2016-04-12-1.626937.

"Click here to find your personal 10-digit Dubai address code," Emirates 24/7, Sep. 1, 2020, available at: https//:www.emirates247. com/news/emirates/click-here-to-find-your-personal-10-digit-dubai-address-code-2013-12-19-1.531958.

Office Action directed to related African Regional Patent Application No. AP/P/2019/011867, dated Jul. 23, 2021, 4 pages.

Notification of Transmittal of the International Search Report and the Written Opinion of the International Searching Authority, or the Declaration issued in PCT/IB2018/051778, dated May 4, 2018, 13 pages.

International Preliminary Report on Patentability for International Patent Application No. PCT/IB2018/051778, dated Sep. 17, 2019, International Searching Authority, United States, 7 pages.

International Search Report and Written Opinion for International Patent Application No. PCT/IB2019/056661, dated Dec. 5, 2019, International Searching Authority, United States, 13 pages.

International Preliminary Report on Patentability for International Patent Application No. PCT/IB2019/056661, dated Feb. 9, 2021, International Searching Authority, United States, 10 pages.

Galanis, A., et al., "Evaluation of the pedestrian infrastructure using walkability indicators," WSEAS Transactions on Environment and Development 12(7):385-394, World Scientific and Engineering Academy and Society, Australia (2011).

Machine Translation of European Patent Publication No. EP2273337-B1, inventors Stroila, M., et al., published Apr. 18, 2018.

Rundel, M., "'What3 Words' Wants to Replace Postcodes With Words—for the Entire Globe," Huffington Post, United Kingdom, published Feb. 7, 2013, accessed at https://www.huffingtonpost.co.uk/2013/07/02/what3words_n_3532122.html, 6 pages.

Pang et al., "Remote Sensing Mapping and Applications," with machine translation attached, Jun. 30, 2016, pp. 127-128.

Office Action for European Application No. 19763109, mailed Oct. 1, 2025, 7 pages.

Xiao, C., et al., "Effective Approach to Extract Road Map from Unmanned Aerial Vehicle Videos," International Conference on Service Science (Oct. 2016), 8 Pages.

You tube video with title "Map Location QR Code Generator | TAGO," URL https://www.youtube.com/watch?v=efHqm-a8TQ0, 2 pages.

You tube video with title "QR Code Generator Tutorial," URL https://www.youtube.com/watch?v=clq5Oz57Xc8, 2 pages.

* cited by examiner

Global Addressing System
200

Network 240

Validation Module 218

Processor 216a

Computing System 214a

Location Module 220

Processor 216b

Computing System 214b

Global Addressing Module 222

Processor 216c

Computing System 216c

Road Detector Module 223

Processor 216c

Computing System 216d

Database(s) / Memory 232a-n

Communications Link 212

Remote Device 202

Communications infrastructure 238

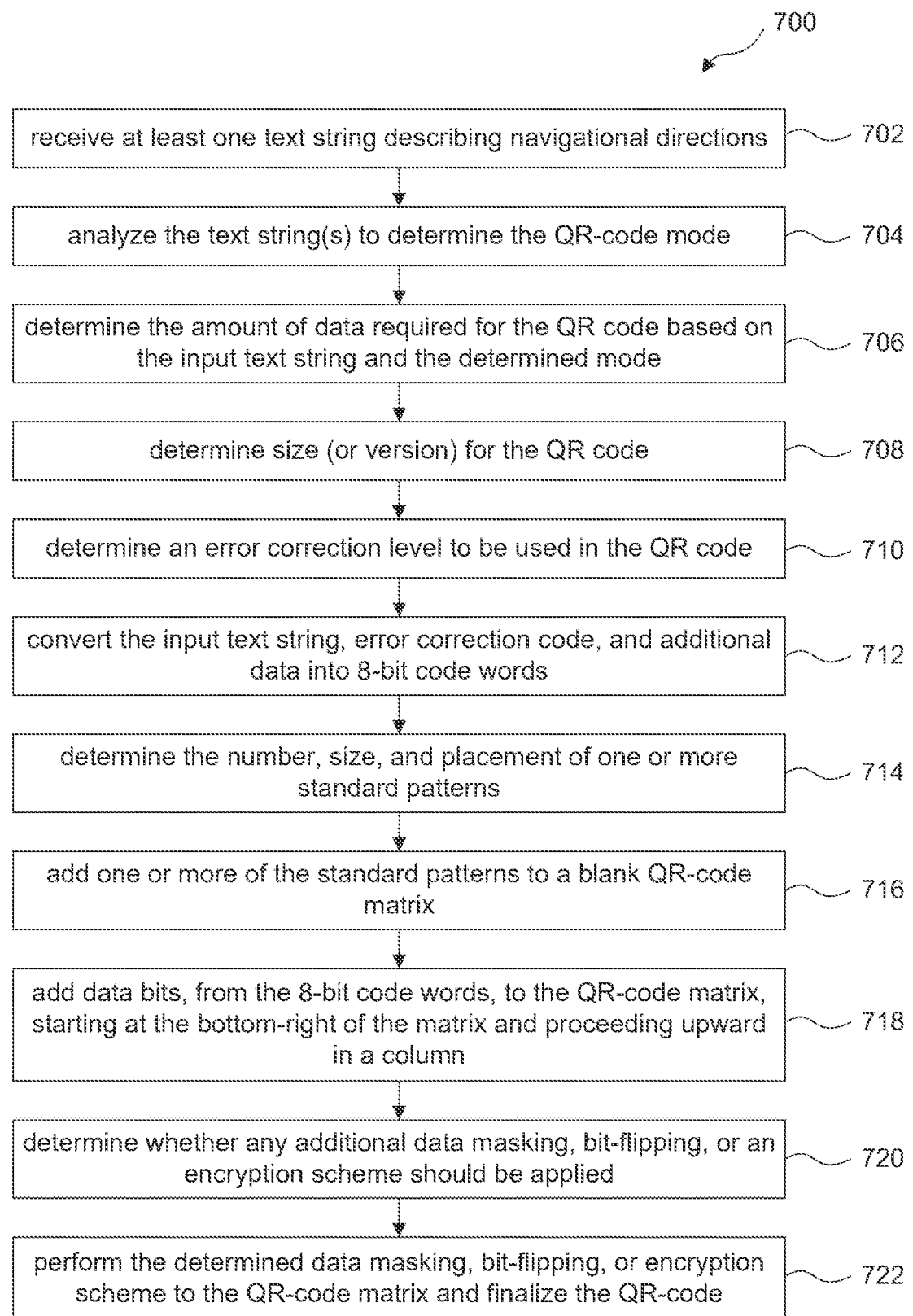

700 receive at least one text string describing navigational directions —— 702 analyze the text string(s) to determine the QR-code mode —— 704 determine the amount of data required for the QR code based on the input text string and the determined mode —— 706 determine size (or version) for the QR code —— 708 determine an error correction level to be used in the QR code —— 710 convert the input text string, error correction code, and additional data into 8-bit code words —— 712 determine the number, size, and placement of one or more standard patterns —— 714 add one or more of the standard patterns to a blank QR-code matrix —— 716 add data bits, from the 8-bit code words, to the QR-code matrix, starting at the bottom-right of the matrix and proceeding upward in a column —— 718 determine whether any additional data masking, bit-flipping, or an encryption scheme should be applied —— 720 perform the determined data masking, bit-flipping, or encryption scheme to the QR-code matrix and finalize the QR-code —— 722

FIG. 7

GLOBAL ADDRESS SYSTEM AND METHOD

CROSS-REFERENCE TO RELATED APPLICATIONS

This application is a continuation of U.S. patent application Ser. No. 18/179,618, filed Mar. 7, 2023, which is a continuation of U.S. patent application Ser. No. 17/750,073, filed May 20, 2022, which is a continuation of U.S. patent application Ser. No. 16/055,775, filed Aug. 6, 2018, which is a continuation-in-part of U.S. patent application Ser. No. 15/461,100, filed Mar. 16, 2017, which are all incorporated by reference herein in their entirety.

BACKGROUND OF THE INVENTION

This disclosure relates to a system, method, and computer-readable device for creating a global address code, in particular, a global address code to provide a uniform address code for any location in the world and to aid in the delivery of services or goods.

Correct addressing is of great importance for enabling the localization of persons, objects, companies and other entities. Correct addressing can furthermore contribute to environmental planning, give a strong impulse to regional, continental and global welfare and facilitate economic, political and social interaction. However, there are regions in the world where addressing is underdeveloped or even absent. Postal codes, street names and/or house numbers are not provided, not logically structured, and/or not registered in a central database. Hence, persons, objects, companies and other entities cannot be easily found and mail and packages are not reliably delivered. As a result, mail carriers refuse to deliver to unmarked locations that do not currently have an assigned street address. This causes unnecessary confusion and can delay the economic development of a region. Delivery systems are known which allow for setting a drop-box as an alternative to an unclear address. The number and availability of drop-boxes are, however, simply too limited.

Even in locations where government-recognized addresses exist, mail carriers still refuse to deliver to certain rural locations. The United States Postal Service provides delivery services using either city carriers, rural carriers, or contract carriers. When a rural delivery route does not serve a minimum of one family per mile, that delivery route may be converted to contract delivery route. But, the contract delivery routes must still meet a certain criteria, otherwise the USPS and its contract carriers will not service that address. If an address is not on a publicly maintained road, is not kept clear of ice and snow in the wintertime, and/or is not less than a half-mile from the carrier's current line of travel, the address will not qualify for delivery service. When an address does not qualify for delivery service, the affected family, individual, or company must establish a drop box in a qualifying location or rent a post office box to receive mail.

Currently, mail carriers require the use of data networks (e.g., the internet or a cellular data network) to deploy their methods and systems. For example, as U.S. Pat. Publ. No. 2016/0092456 discloses a location identifier as a barcode that includes, among other things, a barcode ID, service data, zip code, and grid coordinates. When the barcode is scanned, a device must query the Internet to retrieve the grid coordinate information. Additional delivery systems and methods, such as U.S. Pat. No. 7,797,104, disclose systems and methods where navigation and routing information is also available from Internet sites. U.S. Pat. No. 8,725,407 describes a mapping system that is in electronic communication with other systems/devices over wired or wireless networks. Each of these methods explicitly require access to the Internet, a wired, or a wireless network to function. None of the systems can operate in rural areas outside a cellular data network.

Additionally, local, state, and national government entities maintain databases that store information describing a publicly maintained road and transportation network. However, the government does not track or store information describing roads, paths, trails, etc. that are located in rural areas or are located on private property. In some jurisdictions, the government does not keep track of any road or transportation network information.

SUMMARY OF THE INVENTION

According to a first aspect, the present disclosure provides a system, method, and tangible computer-readable device for creating a global address. Specifically, the present disclosure provides a system, method, and computer-readable device comprising a memory, at least one processor or processing module, and a communications link capable of facilitating data transmissions between a remote device associated with a specific remote user and the processor or processing module. The system's processor or processing module are configured to receive account information and location data, describing a specific user and a specific global location, respectively. Upon validating the received information and data, the processor determines turn-by-turn navigational data for the receiving location. The processor is further configured to create a location code based at least in part on the received account information, the received location data, and the determined navigational data.

In an embodiment, the present disclosure further provides a method for requesting a global address. The method includes sending account information and global location data to a remote computer. In an embodiment, the global location data may include at least one of longitude, latitude, and altitude of a specific global location. The method further includes receiving a location code from the remote computer. In an embodiment, the location code is based at least in part on a combination of the account information, the specific global location, and the turn-by-turn navigational data. The location code may be encoded into a QR code, printed, and used a physical label. Furthermore, the encoded global location and turn-by-turn navigational data may be decoded, even in rural areas outside a cellular data network.

In an embodiment, the account information may include a username and/or password. In yet another embodiment, the system, method, and computer-readable device may provide an interactive map to a remote user to obtain location data based on the user's selection.

BRIEF DESCRIPTION OF THE DRAWINGS

The invention will be elucidated on the basis of a number of exemplary embodiments shown in the attached schematic drawings, in which:

FIG. 7 is a flowchart illustrating a method for creating a global address, according to an example embodiment.

DETAILED DESCRIPTION OF THE INVENTION

Figure 1:
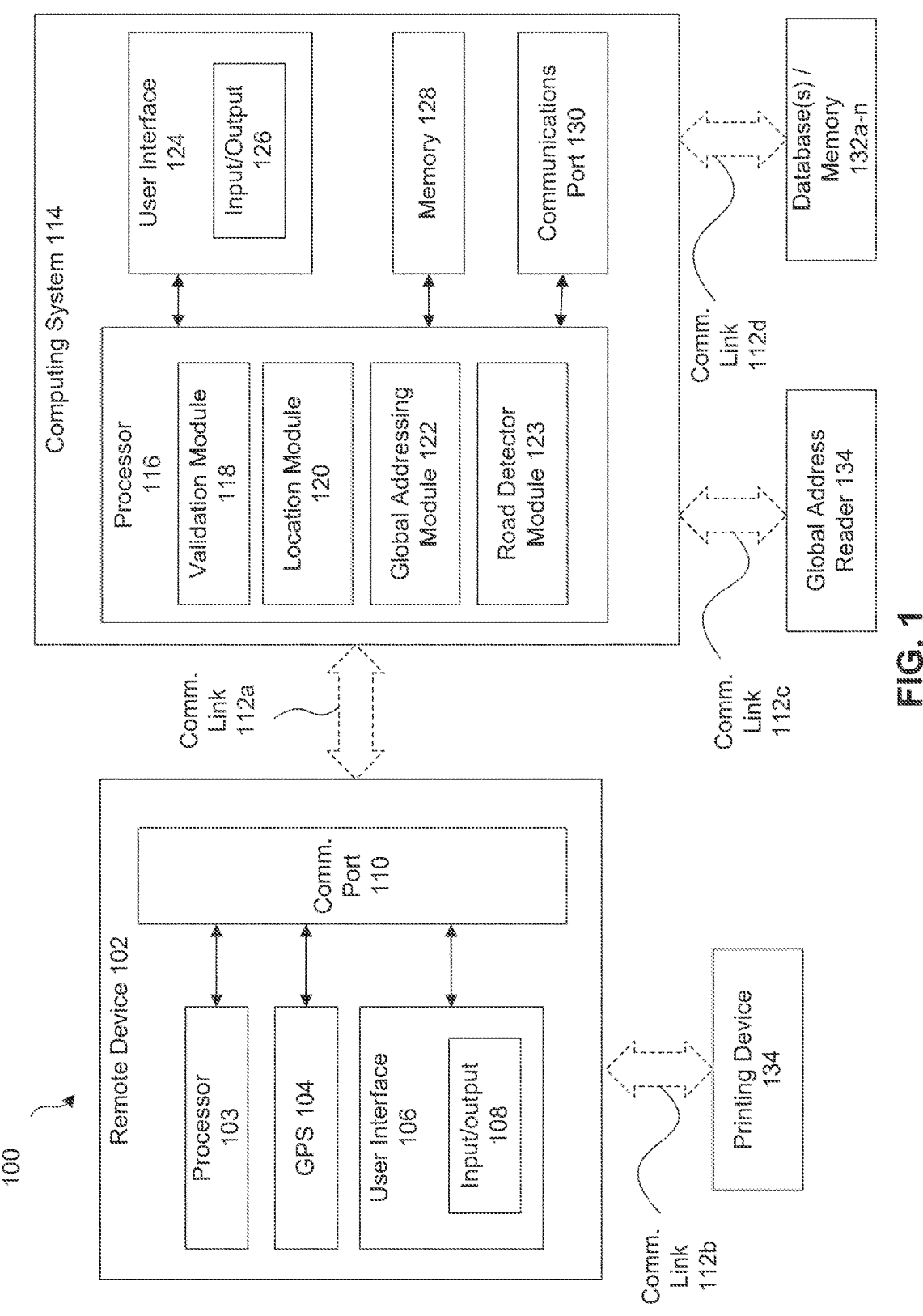
FIG. 1 is an example computer system useful for implementing various embodiments.

As required, a detailed illustrative embodiment of the present invention is disclosed herein. However, techniques, systems and operating structures in accordance with the present disclosure may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of a preferred embodiment as well as alternate embodiments such as a simpler embodiment or more complex embodiments for alternate devices of the present invention.

In countries around the world, many geographical addressing systems have been created in order to identify or describe a geographic location of a specific residence, business, street address, etc. Each country or principality has adopted its own version of such geographic addressing systems. For example, in the United States one generally identifies/describes a geographic location using a street number, street name, city, state, and a zip code that includes up to nine numerical digits. Other countries also use postal codes similar to the United States zip code. However, in countries like Canada, the postal code may indicate on which side of a residential street a person lives. In the United Kingdom, there are at least six valid postcode formats that mix and match alphanumeric characters to create an outward code and an inward code. In many countries and principalities around the world, there are geographic locations that do not have any type of addressing system. Rural areas such as areas outside Erbil city in Kurdistan, Iraq, have no existing address systems. Thus, in some areas of the world, very complex addressing systems are in place, while other portions of the world have no such system at all.

In view of the foregoing, there exists a need for an improved system, method, and apparatus for creating a globally recognized addressing system. Furthermore, there exists a need for an improved system, method, and apparatus to provide navigational data to rural or remote locations that are not serviced by a mail carrier and/or are located in an area outside a data communications network.

This disclosure provides a method and system for creating a unique global address code for any location in the world. The disclosure further provides a localization system for determining or confirming data describing a location, in particular a delivery location for delivery of services or goods, wherein the location can be provided with a uniform address or location code and wherein the address or location code comprises encoded navigational data that can be decoded without the internet or any assistance of a data network.

For illustrative purposes, embodiments, as provided herein, are described with respect to creating a unique global address for locations worldwide. A skilled artisan would recognize that the techniques disclosed herein can be applied to other sorts of personal and/or entity information.

FIG. 1 illustrates a functional block diagram of an exemplary global addressing system 100, useful for implementing various embodiments of the present disclosure. As will be described in greater detail below, a user may interact with global addressing system 100 to create a global address code for a specific global location. As depicted, remote device 102 is in electronic communication with at least one computing system 114 over communications link 112*a* and at least one printing device 134 over communications link 112*b*. In an embodiment, remote device 102 includes one or more features to provide additional functionality. For example, the remote device 102 may include, for example, processor 103, global positioning system ("GPS") receiver 104, user interface 106, and communications port 110. In an embodiment, user interface 106 may further include user input/output device(s) 108.

The computing system 114 likewise includes one or more features to provide additional functionality. For example, computing system 114 may include at least one processor 116, user interface 124, and communications port 130. In an embodiment, processor(s) 116 may additionally include validation module 118, location module 120, and global addressing module 128. In an embodiment, user interface 124 may further include user input/output device(s) 122. In an embodiment, computing system 114 is in electronic communication with global address reader 134 over communications link 112*c* and/or at least one database/memory system, i.e., database memory 132*a-n* over communications link 112*d*.

For purposes of this discussion, the term "module" shall be understood to include at least one of software, firmware, and hardware (such as one or more circuit, microchip, processor, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner. As such, one or more modules may be used alone (or in combination) to provide an improved system, method, or apparatus for creating a unique global address code for a specific global location.

Remote device 102 is a remote computing device capable of interacting with a remote user. In an embodiment, the remote device may be implemented using a personal computer, a laptop computer, a tablet, a smartphone, or other communications device capable of communicating with computing system 114 over a communications link. As will be discussed in greater detail below, a remote user may interact with remote device 102 to send demographic and/or geographic data, describing a specific person or place, to computing system 114. Further, as will be discussed in greater detail below, computing system 114 uses this information to generate a global address describing the specific person or global location.

In an embodiment, remote device 102 includes GPS receiver 104. GPS receiver 104 may be implemented using either global navigation satellite system (GNSS) type receivers or any other GPS receiver capable of providing the remote device's real-time location.

In an embodiment, user interface 106 further includes input/output device(s) 108. The input/output device(s) may be used to facilitate interactions between a user and the remote device. For example, input/output device(s) include monitors, displays, keyboards, pointing devices, joysticks, buttons, touchscreens, graphical user interface buttons (GUI), etc., that communicate with a processor through user interface 130. In an embodiment, a user may use a keyboard or touchscreen to enter, or alternatively confirm, demographic and/or geographic information describing a specific person or global location.

In an embodiment, computing system 114 further includes memory 128. Memory 128 is implemented as a main or primary memory, such as random access memory (RAM). Memory 128 may include one or more levels of cache. The memory may have stored therein control logic, such as computer software, and/or data. In additional embodiments, memory may also include one or more secondary storage devices or memory such as a hard disk drive and/or a removable storage device or drive. The removable storage drive may include a floppy disk drive, a magnetic tape drive, a compact disk drive, and/or any other storage device/drive.

In an embodiment, computing system 114 further includes at least one processor 116. As depicted in FIG. 1, processor 116 further includes validation module 118, location module 120, global addressing module 122, road detection module 123, and/or any other module necessary to perform the functionality described herein. In additional embodiments, processor 116 includes only a single module or any modules contemplated herein. Each module may be implemented as logic embodied in software, firmware, hardware, and/or operating system implementations in order to perform or carry-out a desired function. Further, as used herein, a module may also be implemented as a collection of software instructions. One or more software instructions in the modules may be embedded in firmware, such as in an erasable programmable read only memory (EPROM). The modules described herein may also be stored in any type of non-transitory computer-readable medium or other storage device.

Figure 2:
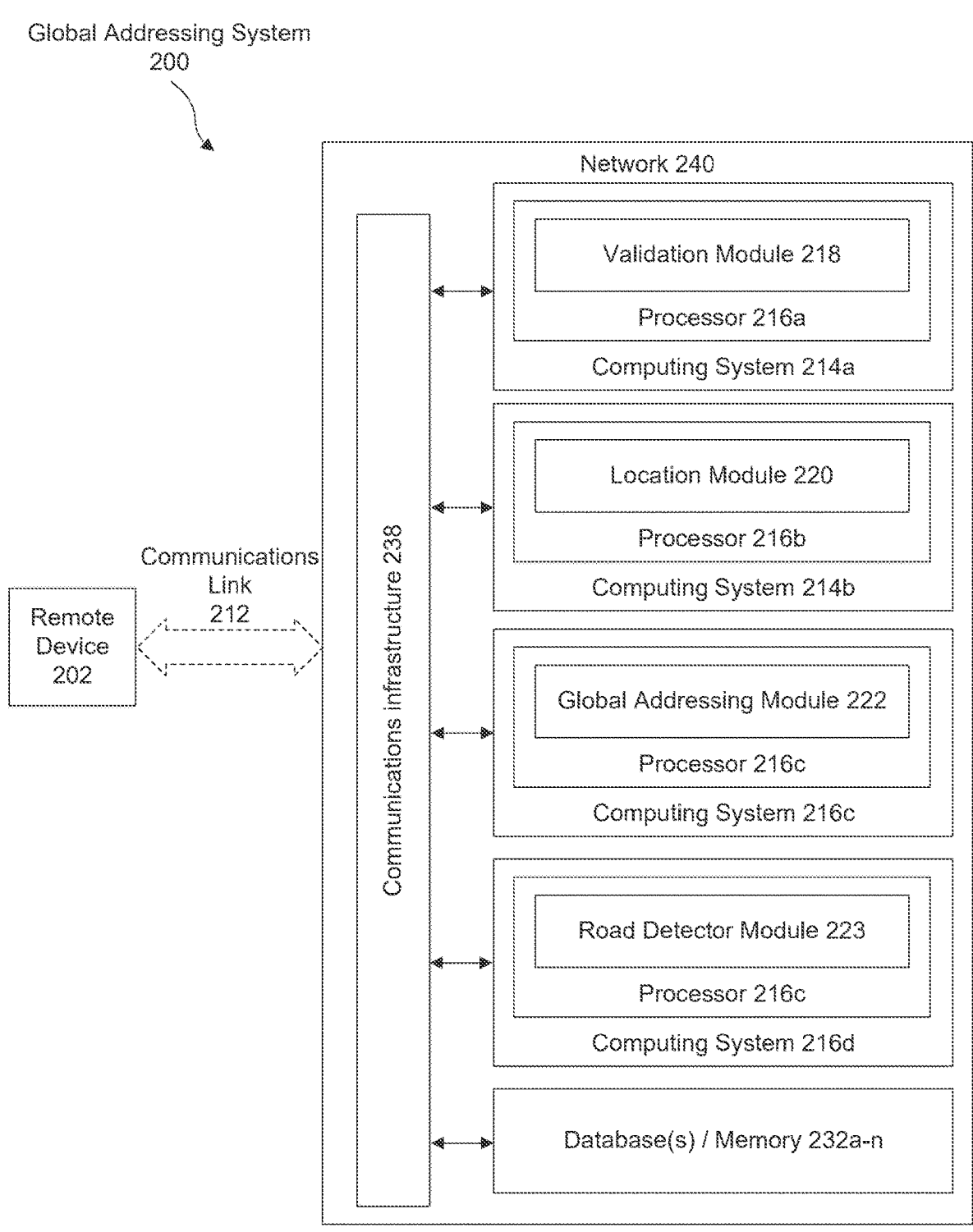
FIG. 2 is a block diagram of processing nodes and modules, according to various embodiments.

In an embodiment, the modules are incorporated using a single computing system and processor. In other embodiments, the modules are incorporated using more than one computing system and/or processor. Referring now to FIG. 2, shown is a non-limiting functional block diagram of global addressing system 200, useful for implementing various embodiments of the present disclosure. As shown, a remote device 202 (such as remote device 102) is in electronic communication with network 240 through communications link 212. Network 240 may be comprised of computer systems 214a-d, each having at least one processor 216a-d. The processors may send and receive data to/from other processors within the network and/or remote device 202 through communications infrastructure 238. For example, in an embodiment, validation module 218, located within computing system 214a, communicates with remote device 202 by transmitting data through communications infrastructure 238 and communications link 212. In another non-limiting example, location module 220 located within computing system 214b, may send and receive data with global address module 222 through communications infrastructure 238. In another example, road detection module 223 located within computing system 214d, may send and receive data with global address module 222 through communications infrastructure 238.

A network (such as network 240 of FIG. 2) may be implemented as a wide area network (WAN), a local area network (LAN), a metropolitan area network (MAN), or any other network capable of performing the functionality described herein. As such, a communications infrastructure (such as communications infrastructure 238 of FIG. 2) may be a wired and/or wireless connection. Further, the communications infrastructure may operate using a communications protocol such as: long term evolution (LTE), Wi-Fi, Bluetooth, radio-frequency, first generation (1G) wireless technology, second generation (2G) wireless technology, third generation (3G) wireless technology, fourth generation (4G) wireless technology, code-division multiple access (CDMA), frequency division multiple access (FDMA), generic access network (GAN), global system for mobile (GSM), or any other network protocol capable of sending and receiving data between nodes within a network and/or a remote device. Accordingly, network 240 may interact with remote device 202 over communications link 212 using any of the aforementioned protocols.

Various example, non-limiting embodiments, of contemplated software, firmware, hardware, and/or operating system modules shall now be discussed.

A validation module (such as validation module 118 of FIG. 1 or validation module 218 of FIG. 2) may provide security functionality. The validation module may be used to confirm the identity of the user. For example, in an embodiment, the user may be required to create a username and password. In an embodiment, the user may be required to confirm his/her identity using a credit card, a duplication of a passport, or biometric data such as a thumb print, finger print, or a retina scan. In an additional embodiment, a user's social media presence may be used to confirm his/her identity. In additional embodiments, the validation module may also track the IP address, location of the user device, MAC address of the user device, network specifications including cell tower or internet service provider locations, timestamps, and any other data that may be used to confirm the location of the user.

Location module 120 and/or location module 220 may be implemented to determine and/or confirm geographic data describing a specific person or geographic location. For example, in an embodiment, the location module may generate and provide an interactive map to confirm a geographic location of received user input. The user may interact with the map to select a location on the map. In an embodiment, the user may enter a street address, a city, state, zip code, country, principality or any other geographical identifier and the location module will present the location to the user through a user interface. The user may then manipulate the map display by zooming in and out; by panning up, down, or to any side or angle; by rotating the map clockwise or counterclockwise; or any other means for manipulating a map.

As described above, map vector data may not be available that describes the road network. Map vector data, may for example, be a vector-based collection of geographic information system (GIS) data about Earth at various levels of detail. Being a vector-based data model, it describes the road network as a connection of geographic coordinates (e.g., latitude and longitude), one connected to another. An example, is for example, is a Vector Map (VMAP) format, also sometimes called Vector Smart Map. In the U.S., the government collects that information and stores it in a public database managed by the National Geospatial Intelligence Area. Often, this information may be manually reported to the entity managing the public database. In some areas and countries, public roads may built without registering them in a public database. the desired route may include private roads that are uncharted. The lack of vector map data presents a great technical problem in delivering goods to remote areas.

Various solutions are presented herein to the technical problem herein. Even in cases where vector road map data is unavailable, raster satellite imagery may be available. Various approaches are disclosed for determining a route in the absence of vector map data.

First, in an embodiment, the user may place a marker in the exact spot on a map. Upon receiving confirmation that the selected global position is correct, the location module sends the geographic data to the global address module. In an embodiment the interactive map may be a satellite image. The user may be prompted to draw the delivery route on the interactive map using a mouse, pointer, touchscreen, or any other method for interacting with the map. For example, the user may zoom in on the map to find an road, trail, path, waterway, etc., and draw a suggested delivery route. The system may be configured to auto-correct a user's input. For example, the system may detect that a user-drawn path is drawn on the interactive map within 10 feet of a detected road, trail, waterway, etc.

Second, in another embodiment, location module 218 may determine vector map data based on the image data. As mentioned above, the map data may be in raster format, describing satellite photographs on a pixel-by-pixel basis. Embodiments may interpret these satellite photographs to determine map vector data using computer vision techniques.

According to the computer vision techniques applied herein, every object class (such as primary, secondary roads) has its own special features that helps in classifying the class. Object class detection uses these special features. Road detector module 123 and/or 223 is configured to detect roads within an images. For example, the Viola-Jones detection technique, normally used for face detection, may be applied here to detect roads. The algorithm may comprise four stages: Haar Feature Selection, creating an integral image, Adaboost Training, and Cascading Classifiers. Using an object detection technique is applied, the pixels of the raster satellite image may be determined.

Once the pixels of the raster satellite image are identified, the latitude and longitude values corresponding to the pixels may be determined. Then, latitude and longitude values are integrated to determine vector map data describing the missing road data. In this embodiment, data describing the newly detected road or pathway is stored in a database and, in an embodiment, the newly detected road or pathway is assigned a unique identifier or name. So, in rural areas where the government does not track or maintain a database describing the unnamed or unknown roads and pathways, this system is capable of detecting and storing this information.

Using the vector map data, the location module may determine a navigational route via newly detected road(s) or pathway(s). The navigational route may be determined, for example, by applying a Viterbi algorithm and may include estimated traversal times. The determined navigational route may include one or more roads or pathways that were previously unnamed, unknown, or did not previously exist in a government-maintained database.

In an embodiment, the location module may be updated to include the most recent database and software updates based on updated satellite images, including any newly assigned unique identifier data.

In an exemplary embodiment, a user may enter "Erbil City, Kurdistan Region, Iraq." Upon receiving this inquiry, the location module produces a satellite image of the city and its surrounding region as retrieved from, for example, an image database (not shown). The user may then zoom in and pan the image to a desired location, such as a pasture behind his or her own residence using known graphical processing interfaces or interactive mapping technology. Upon placing a marker on the map, the location module will prompt the user to confirm the location. Upon confirming the location, the location module sends the geographic data of the selected location to the global address module.

In an embodiment, the location module may also generate recommended driving, walking, boating, or cycling instructions/directions. The directions may originate from a specific business location in the region, a local airport, bus depot, or any other common hub for public transportation. In such an embodiment, the user may be prompted to confirm the instructions/directions to the rural delivery location. The user may also be prompted to define a more efficient travel route. As an example of such an embodiment, if the user entered the GPS coordinates "47°02'09.4"N 9°00'18.5"E", the location module would detect a location near Glarus, Switzerland. Upon confirming the location, as described above, the location module would suggest traveling instructions from a Swiss Post Office, the Glarus train station, the Zurich International Airport, the Zurich HauptBahnhof, or any other transportation hub. Such locations may be determined, for example, from a database listing of such hubs identified by coordinates, using an algorithm to determine distances between hubs in the database and the GPS coordinates entered and then select the hubs having the smallest distance value. The user would then either select a suggested travel route or the user may be prompted to draw a more efficient route. Based on the user input, the system will determine geographical coordinates for drawn path and using the geographical coordinates the system determines navigational directions.

In an embodiment, the navigational directions may also begin at a known structure or landmark, such as a religious building, a hospital, a shopping center, convenience store, a geological feature, or another known feature that is directly accessible from a public transportation network. For example, the first navigational instruction may instruct the user to navigate to the known location, and from the known location, begin traveling on roads or paths outside the publicly-maintained transportation network. Based on the user input, the system will determine geographical coordinates for drawn path and using the geographical coordinates the system determines navigational directions.

In an embodiment, the location module may determine a road, path, or waterway network using a road map comprising government recognized roads and a satellite image comprising remote and/or rural paths. The network map may be refined and represented using a direct graph. The network map is then converted into the global coordinate, which is much more convenient for performing navigational tasks than the other types of coordinate. Using the global coordinates of the map, the shortest path for motion is estimated using a heuristic searching method. In an embodiment where the path is drawn by the user, the location module may be configured to adjust the drawn path to match up with the network map and/or the remote and rural paths of the satellite image. The location module may then assign global coordinates to the drawn path and determine the navigational data/instructions.

Global address module 122 and/or global address module 222 is used to generate a specific global address or global address code based on demographic and/or geographic data describing a specific person or geographic location. In an embodiment, the global address module receives user input, processes the received embodiment, and generates the global address code. In an embodiment, the received user input describes a specific global location. The user input describing a specific location may include at least one of: a nationally recognized street address, residential or commercial property, business name, resident name, longitude, latitude, and altitude. In an embodiment, the global address module may receive specific location data from the location module. In an additional embodiment, the specific location data may be received from the user directly. The generated global address code will be discussed in greater detail below, with reference to FIGS. 3 and 7.

Database/Memory 132*a-n* and/or Database/Memory 232*a-n* may be implemented within network 240 to provide additional storage space. In an embodiment, Database/Memory 132*a-n* and/or Database/Memory 232*a-n* may be configured to store a list of roads, paths, trails, riverbed, abandoned railway, or other navigational landmarks that may be useful in navigating from one location to another location in a rural, remote, nomadic, or adventure location. In embodiments where the road, path, trail, etc., is not a government-recognized or publicly-maintained byway, the database may be configured to assign a unique name or identifier for each road, path, trail, or landmark.

For example, the location module, as described above, may determine navigational directions that follow a mountainous trail that begins near a unique geological formation. The determined navigational direction may include specific directions to the geological formation and then changing course by traveling east, 100 meters after the unique rock formation. In such an embodiment, the system will assign the turn, e.g., fork, in the path and/or the geological formation a unique name or identifier and store data describing the fork and/or rock formation in Database/Memory 132*a-n* and/or Database/Memory 232*a-n*. The same process may be performed in areas where a new, unnamed, road is created or a new delivery location is requested. In an embodiment, the unique name or identifier may be one or more descriptive words, a global position describing the location, or a series of alphanumeric characters.

Assigning and storing data describing areas where a new, unnamed, road is created or for other landmarks offers at least three benefits not offered by current systems and methods. First, the disclosed method provides more clear and accurate navigational data/instructions based on the roads, paths, and landmarks not tracked or otherwise known. Second, the disclosed method provides a solution for areas or jurisdictions that do not track or maintain data describing a rural road or transportation network. Third, by creating and storing unique identifiers for the new roads or other landmarks, the amount of data to be encoded into a QR code is reduced.

In an embodiment, the Database and Memory systems may also store code words for commonly-used directions. For example, for a navigational direction "turn right at the next intersection," the system may store an acronym such as "tratni" or it may be assigned an alphanumeric code such as "tr4." Employing code words may reduce the amount of data required to encode and decode the navigational data. Further, the systems used to encode and decode the QR codes, as described herein, may be configured to store a list of commonly-used directions in local memory.

Various example, non-limiting embodiments, of contemplated global address creation methods shall now be discussed.

Figure 3:
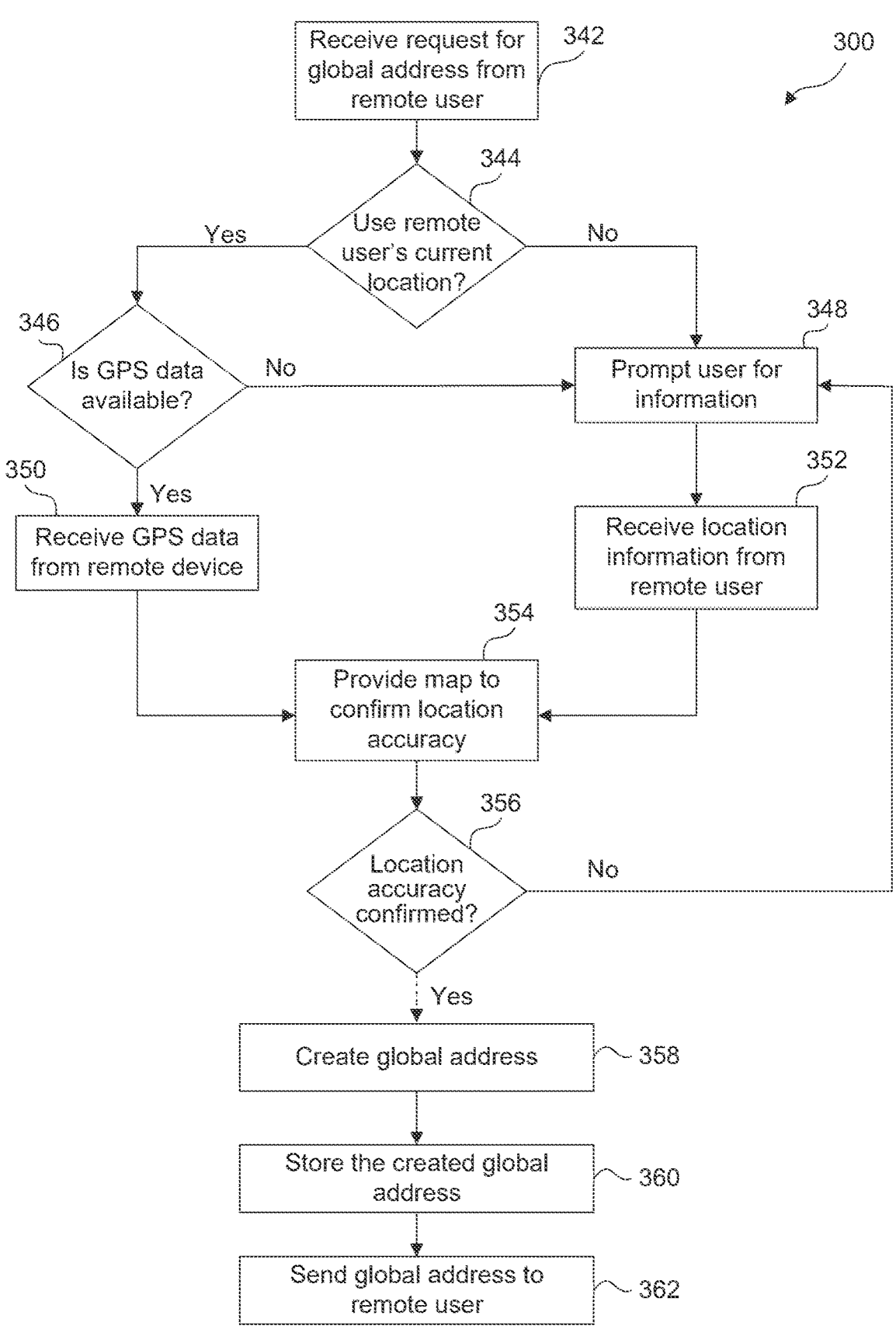
FIG. 3 is a flowchart illustrating a process for creating a global address, according to an example embodiment.

FIG. 3 illustrates method 300, a method for creating a global address using the global addressing systems illustrated in FIGS. 2 and 3, as described above. At step 342, the system receives a request for a global address from a remote user.

At step 344, the system determines whether to use the remote user's current location or a different location. This determination may be performed by prompting the remote user to select a "use current location" option and/or based on the information received at step 342. For example, the information received at step 342 may indicate that the user's current location is to be used. Such information may include a checkbox, graphical user interface, web-form, or saved preferences based on a user account indicating the remote user's selection.

At step 346, the system determines whether GPS data is available. If the GPS data is available, the system advances to step 350, where it is determined that the remote device is associated with the remote user. Step 350 will be discussed in greater detail below. If the GPS data is not available, the system may prompt the remote user to turn on the device's GPS system (not shown) or the system may automatically advance to step 348.

At step 348, the system prompts the user for demographic and/or geographic information to be used in creating a global address and/or a user account. Demographic data may include: first name, last name, age, gender, household information, etc. Geographic information may include: current street address (when possible), zip code (when possible), global latitude, global longitude, elevation, or any other information that may be used to identify a specific global location. In an embodiment, step 348 may further include providing an interactive map where the user may place a map indicator over the specific global location. In an embodiment, the interactive map will assist the system in determining the latitude, longitude, and altitude of the indicated location.

At step 352, the system receives the information from the remote user. In an embodiment, step 352 may further include checking the received data for errors. For example, if the received information provides a global location that is on a mountain top, in the ocean, or another uninhabitable place, the system may return to step 348. In an embodiment, the system may confirm that the mountain top, ocean, or other inhabitable place is indeed the intended delivery location, and advances to the next step.

Returning now to step 350, the received data may include latitude, longitude, altitude, or any other data point that may indicate the global position of the device. In an embodiment, the system may use a cellular network, wifi network, or any other type of data network to triangulate the location of the remote device in order to determine the global position of the remote user and the remote device.

At step 354, the system provides a map for the user indicating the received geographic location. For example, if the user entered the latitude: 77°03'50.4"W and longitude: 38°48'04.2"N, the map will display a map indicator at the United States Patent and Trademark Office in Alexandria, Virginia, USA. If the user entered the latitude: 43°57'23.6"E and longitude: 36°14'00.9"N, the may will display a map indicator at the Erbil International Airport in Erbil, Kurdistan, Iraq.

At step 356, the system will prompt the user to confirm the accuracy of the map indicator placed on the map provided at step 354. If the indicator is not placed correctly, the system will return to step 348. If the indicator accurately depicts the specific location, the system advances to step 358.

At step 358, the system creates the global address based on the received latitude, longitude, and altitude. The global address may be created in the form of at least one of a barcode, a matrix barcode, a quick response code ("QR code"), or a machine-readable optical label. In an embodiment, the location code may define a shape, based on a feature of the remote location. For example, in an embodiment where the system creates a QR code for a location within Kenya, the QR code may define a shape of the letters "KE." Or, where the system creates a QR code for a location within Iraq, the QR code may define a shape of the letters "IQ." Or in an additional embodiment, where the system creates a QR code for a location within the Netherlands, the QR code may define the shape of the geographic boundaries of the country. In additional embodiments, the global address may also be created and encoded onto a magnetic stripe, an embeddable EMV chip, a proximity card, a smart card (i.e., any card that has a microprocessor within the card configured to send and receive data with a card reader), a contact card that has a memory chip embedded therein, a contactless card configured to wirelessly transmit data, or an RFID chip.

In embodiments where the global address is created in the form of a QR code, the QR code may be created using one or more QR codes of the same or different sizes. The QR code size may range from 21 pixels by 21 pixels up to 177 pixels by 177 pixels. As used herein, the term pixel refers to the black and while squares that define a single square, or QR-code pixel, of a QR code. In some instances a single QR-code pixel may require more than one electronic-display pixel to render the QR-code pixel, based on the screen configuration and/or other display settings of the electronic device used to render the QR code.

The QR code may be created using at least one encoding mode. The encoding modes may include, for example: numeric mode, which may contain up to 7,089 characters; alphanumeric mode, which may contain up to 4,296 characters; byte mode, which may contain up to 2,953 characters; and/or kanji mode, which may contain up to 1,817 characters. The QR codes may be encoded using the Reed-Solomon error correction method, which creates error correction code words based on the encoded data. A QR-code reader may use the Reed-Solomon error codes to determine whether the data has been read (by the code reader) correctly. If it is determined (by the code reader) that the data has not been read correctly, the Reed-Solomon code words may be used to correct the data errors. Accordingly, the global address may be encoded into QR codes having error correction capabilities ranging from 7-30%, based on the desired accuracy, available data, or other factors. Exemplary methods for creating a QR code are illustrated in FIG. 7 and are disclosed in greater detail below.

As described above, in areas without mobile access, a latitude/longitude location included in a QR code may be of little help. This is because the route information still needs to be determined. And, a mobile device may be unable to determine the route without map vector data. Local map vector databases may be available, but they may take up too much memory, and may be difficult to be up-to-date.

To deal with the technical problems of lack of memory, lack of connectivity, and lack of up-to-date data, embodiments may encode the complete route information, from start to destination, in a QR code. That is, in an embodiment, the system is capable of encoding a complete set of navigational data and route information into a QR code, such that the system may later decode the information when outside a data network.

An example of route information that may be decoded, from one or more QR codes, without a network connection, includes an ordered set of navigational instructions. An example of an ordered set of navigational instructions is: (1) drive the vehicle East, 5.2 km past the known hospital; (2) turn right on the unmarked road located at a specific GPS coordinate; (3) follow the unmarked road to the mosque having a green dome; (4) walk West 100 meters up the hill to the third row of unmarked houses; and (5) deliver the package at the blue door, which is the third door on the right.

As described above, a QR code only has a very limited about of space. To deal with that technical problem, the route information may be compressed so the information encoded uses fewer bits than the original representation of the data . . . . Compression, as described herein, can be either lossless (inexact) or lossy (exact) compression. Lossless compression reduces bits by identifying and eliminating statistical redundancy. No information is lost in lossless compression. Lossy compression reduces bits by removing unnecessary or less important information.

Examples of lossless compression techniques include: Lempel-Ziv (LZ) compression, DEFLATE compression which is a variation on LZ optimized for decompression speed and compression ratio, Lempel-Ziv-Welch (LZW) compression, and other LZ methods that use a table-based compression model where table entries are substituted for repeated strings of data. In such embodiments, this compression table is generated dynamically from earlier data in the input. The table itself is often Huffman encoded. Additional examples of lossless compression include Zip (on systems using Windows operating system), StuffIt (on Apple systems), and gzip (on systems running UNIX).

At step 360, the system stores the created global address in at least one database and/or memory device.

At step 362, the system provides the global address to the remote user. In an embodiment, the system provides the global address in a printable format, so the remote user can print the global address onto a printable medium, including: paper, a sticker, a box, a business card, a plastic card, or any other medium that may be used to ship a letter, parcel, or package, or a printable medium that may alternatively be affixed to a letter, parcel, or package. In an additional embodiment, the global address may be provided to the user in a sharable electronic format such as a picture, image, pdf, or other medium commonly used to share images. In additional embodiments, the system may be configured to transfer/encode the global address to a card having a magnetic stripe, an embeddable EMV chip, a contact card that has a memory chip embedded therein, a contactless card configured to wirelessly transmit data, and/or an RFID chip. In such embodiments, the card may have a shape that resembles a business card or a credit card.

Various example, non-limiting embodiments of delivery systems that use the contemplated global address shall now be discussed.

Figure 4:
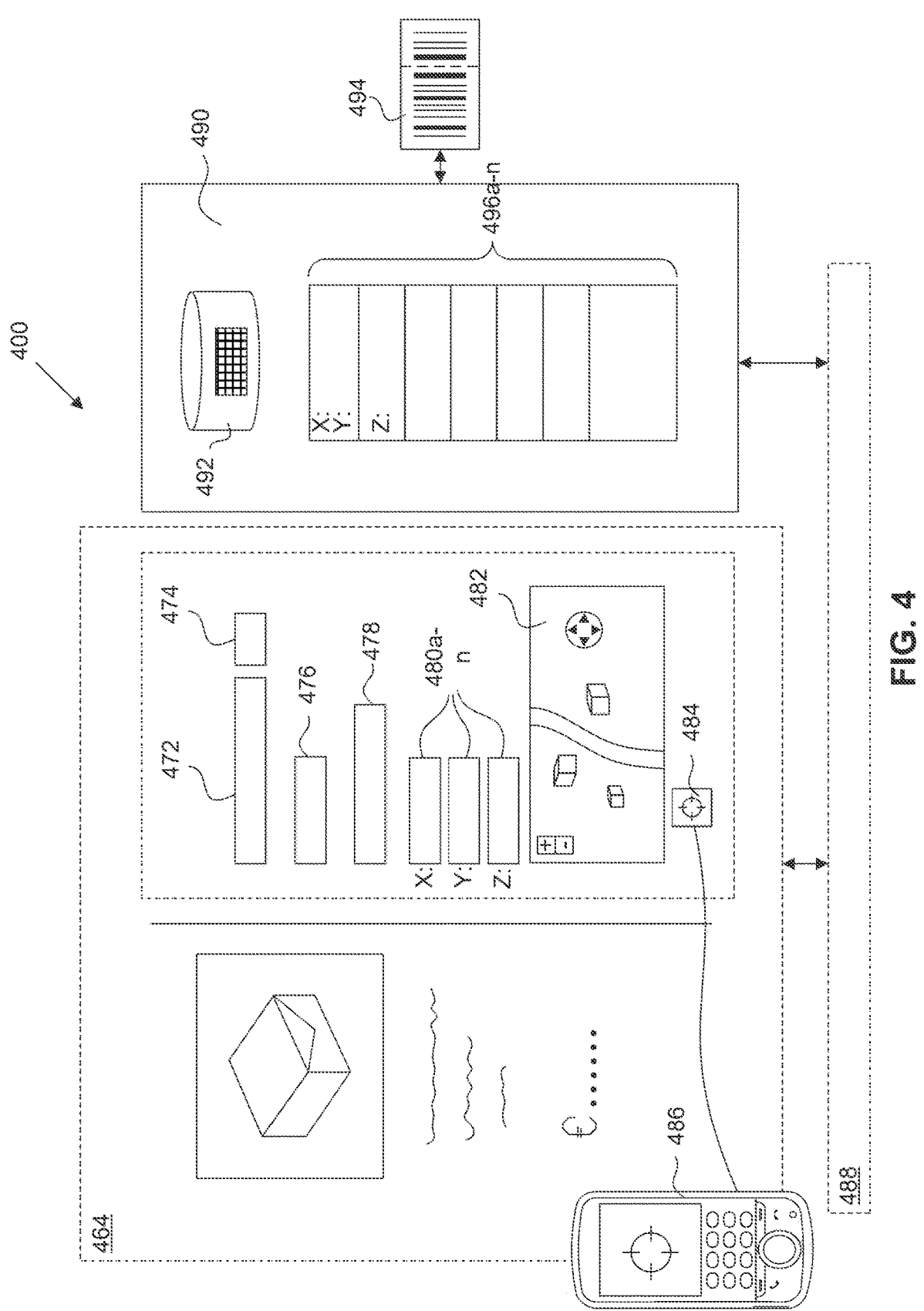
FIG. 4 is a schematic view of the delivery system with an ordering section, a localization section and a delivery section, according to an embodiment of the invention.
Figure 5:
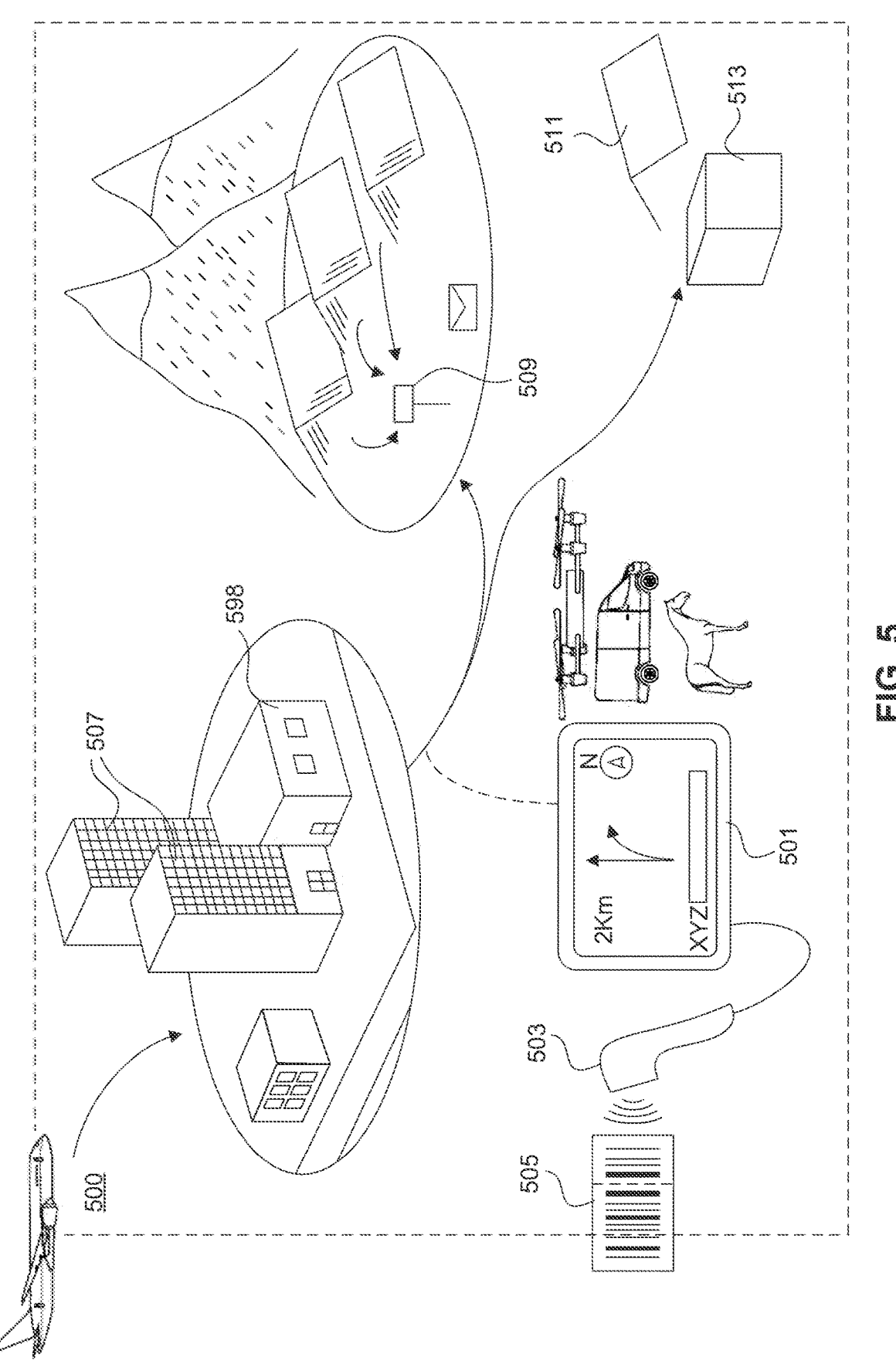
FIG. 5 is a schematic view of the delivery section of the delivery system according to an embodiment.

FIGS. 4 and 5 show delivery systems 400 and 500, respectively, for delivery of services and goods using a global address according to embodiments. Delivery system 400 comprises an ordering section 464 for ordering of goods and services, and a localization section 490 for choosing or determining a desired delivery location.

The ordering section 464 is a part of a website, an application, or a mobile application (an "app") which is offered by a supplier of services and/or goods. For example, the website or app may be offered by a shipping company and/or a parcel service. The ordering section 464 is provided with an interface which is reachable by the intended recipient of the services and goods, in most cases a consumer. As an alternative, the interface may also form part of an internal ordering system of a supplier of the services or goods. The interface comprises representation and input for obtaining and inputting data about the desired service or the desired goods. Furthermore, the ordering section 464 is electronically coupled to the localization system 490, over network link 488, for inputting data, such as a street name 472, a postal code 476 and/or a house number 474, if available. Additionally, the option can be provided to designate a drop-box 478. The ordering section 464 is further provided with input fields 480*a-n* for the input of coordinates, preferably GPS coordinates, an interactive map 482 for manually marking a delivery location, or a localization module 484 for retrieving the current location of the recipient. The current location of the recipient can be retrieved, for example, on the basis of the current location of a mobile device 486, such as a telephone, tablet or laptop. The localization module 484, for example, comprises instructions for communicating with the software of the mobile device 486 to obtain data about the current location of the mobile device. The mobile device can, for example, establish the current location from triangulation with nearby cell towers or on the basis of a GPS module in mobile device 486. Applications using data about the current location of a mobile device are categorized as 'Location Based Services' (LBS).

The input location data or location data that has been otherwise generated are transmitted, over network link 488, to the localization system 490 during or after finalizing the order. The localization system 490 is provided with processing and/or conversion software 492 for processing, interpreting and/or converting the location data about the delivery location into a predetermined data format and a storage medium for storing the location data in a database structure. In an embodiment, the predetermined data format is constructed from a group of components comprising: XY coordinates (496*a-n*) which are indicative of the longitude and latitude of the desired delivery location, a Z coordinate (496*a-n*) that is indicative for the height, preferably above sea level, at which the delivery location is located and furthermore, if available, an indication of a name, an indication of a street, an indication of a house number, an indication of a place, postal code, province and/or country, and optionally special remarks about the delivery location. The location data is digitally coupled to or stored with the data about the order. If so desired, the location data can be converted into a compact location code 494 and visualized on a screen or offered for printing on a label which can be applied to the product that is to be delivered.

FIG. 5 illustrates delivery system 500. Indeed, the logistics chain according to FIG. 5 is relatively simple up to a local warehouse 598 that is located in an area with recognized, conventional addressing. The delivery up to this point can take place with the delivery system according to the invention as well as conventionally, based on street name, postal code and house number. From the warehouse 598 onwards, delivery is executed based on the stored location data. More specifically, from that point on, the delivery may occur outside a publicly-maintained road or transportation network. The delivery system comprises a navigation system 501 with a scanner 503 for scanning a location code 505, or an interface for inputting digitally provided or printed location data (not shown). The navigation system 500 in this example is a GPS based navigation system.

The navigation system 500 can be provided using any means of transportation, for example and without limitation: a truck, a car, a bicycle, a quad-copter, a drone, a pack animal, boat, canoe, or any other method for delivering/retrieving a passenger, patient, customer, package, or parcel. The navigation system 500 is not limited to navigation via registered roads, but can also provide assistance when navigating over trails, pathways, and waterways to coordinates, such as the XYZ coordinates. When delivering at heights (the Z coordinate), for example in a multi-level building 507, delivery to a designated location in the lobby, on the roof 511, or a mountainous location is also possible. Use can also be made of a drop-box 509, 513.

Communication of the location data between the ordering section, the localization system and the delivery system is preferably executed via secure connections. Furthermore, the database structure is protected against intrusions by unauthorized third parties. This ensures the privacy of the involved parties. If so desired, the localization system could, however, allow for selective data exchange. For example, in return for a fee, data may be provided to third parties for the purpose of marketing goals or governmental goals.

In an alternative embodiment, the processing and/or conversion software of the localization system is arranged for checking the input or obtained location data based on the predetermined preconditions, and is further arranged for providing a notification of rejection to the ordering section 464 in the case that the location data does not meet the preconditions. A precondition can, for example, be a limited geographical delivery area, such as based on series or ranges of allowed and excluded XY coordinates or excluded places, postal codes, provinces or country indications. For example, if the XY coordinates indicate an area within a warzone, the system may reject such an address designation.

In a more general application of the invention, the processing and/or conversion software is arranged for assigning the input or obtained location to a person, a company, or a delivery location for a limited period of time. The period of time is, for example, a given number of days, weeks or months. During this period, the person or company can use the assigned location for purposes such as the aforementioned delivery of goods and/or services, or other purposes. After expiration of the limited duration, the assigned location is unassigned or deleted. In an embodiment, the system may maintain records of the username, password, and/or confirmed identity of the user associated with the location. As an additional security measure and to ensure lawful conduct/use of the global address systems described herein, global address and identity information may be shared with local law enforcement agencies.

In a further embodiment of the invention, the processing and/or conversion software of the localization system is arranged for converting the input or obtained location data to a easily readable format, for example a code 505 with text or visual elements. In particular, the processing and/or conversion software is arranged for at least partially converting the XY coordinates and optionally the Z coordinate to a code 505 from which the continent, the country, the province and/or place associated with said coordinates can be easily read. The code 505 then comprises at least a first component which enables delivery with the use of a GPS based navigation system, for example with a part of or the entire XY coordinates, and a second component which indicates continent, country, province and/or place. In this manner, a global, universal postal code can be obtained. The second component is derived by the processing and/or conversion software from the given XY coordinates by comparing these coordinates with known series or ranges of coordinates for certain continents, countries, provinces and/or places.

Figure 6A:
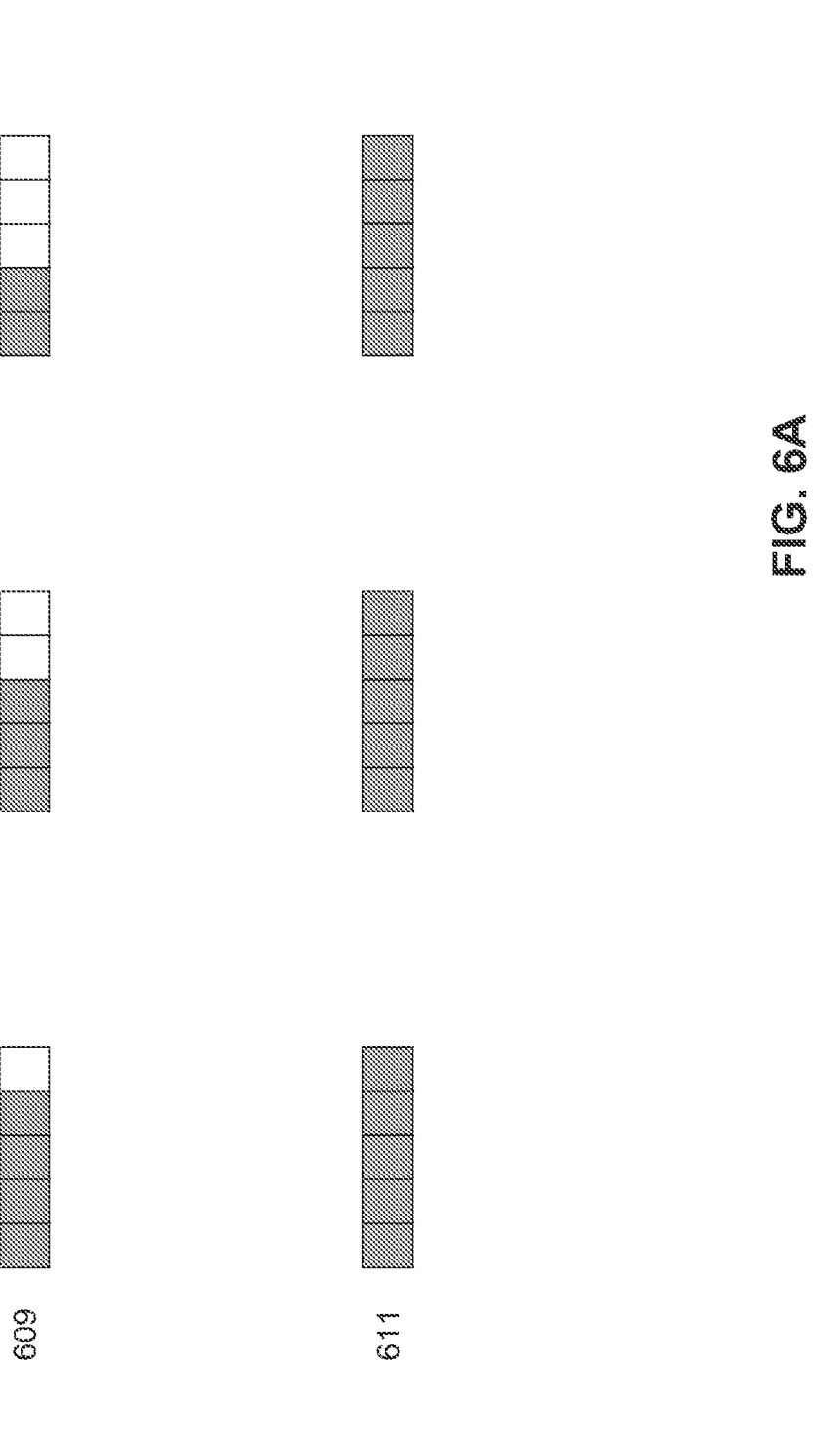
FIG. 6A is a schematic comparison between the coverage of a conventional addressing system and a delivery system according to an embodiment.

As schematically shown in FIG. 6A, the coverage area of the localization system and the delivery system is enlarged by using the XY coordinates according to the invention, such that locations can be unambiguously determined in cities 601, as well as towns 603, rural areas 605, tribal areas (not shown), and nomad or adventurous locations 607. In particular, the comparison is made between a first series of coverages 609 for the aforementioned areas when using conventional addressing based on street names and house numbers, and a series of coverages 611 when using the delivery system and the localization system according to the invention. As used herein, a rural area is an area having less than one household, or delivery location, per square mile and/or an area that is not within a data network. Tribal areas, as used herein, are geographic regions having autonomous, or semi-autonomous, tribal leadership and may have tribal rules. Also, as used herein, nomad and adventurous locations are permanent or temporary locations that are not directly accessible from a publicly maintained road, are not kept clear of ice and snow in the wintertime, and/or are located more than a half-mile from a publicly maintained road or existing mail route. Examples of nomad an adventure locations may include a farm house or barn, a cabin in a mountainous location, a shepherd encampment, a base camp, an oil rig, or any other similar location.

Figure 6B:
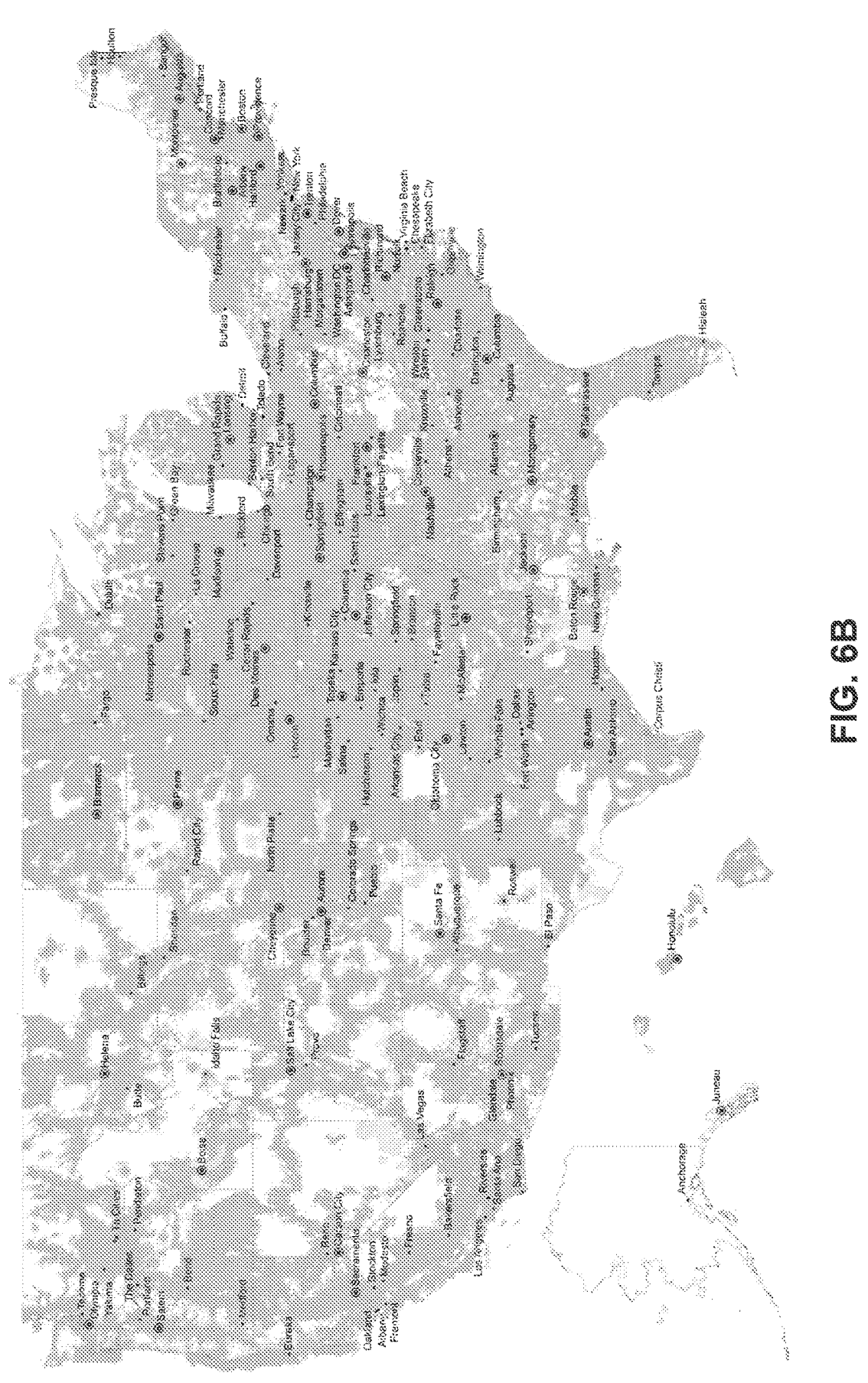
FIG. 6B is a map illustrating the approximate cellular data coverage in the United States.

FIG. 6B illustrates an approximation of data network coverage of the United States. The regions of the map that are shaded illustrate geographic areas where cellular data networks are available. The unshaded regions of the map illustrate geographic areas where no cellular data networks are available. As described herein, the unshaded areas are rural areas. Users living in, or otherwise visiting, such rural areas cannot simply use a cellular device to look up directions for traveling from one place to another, or for finding their way after becoming lost.

Figure 6C:
FIGS. 6C and 6D depict a network of roads and paths of a rural geographic area.
Figure 6D:
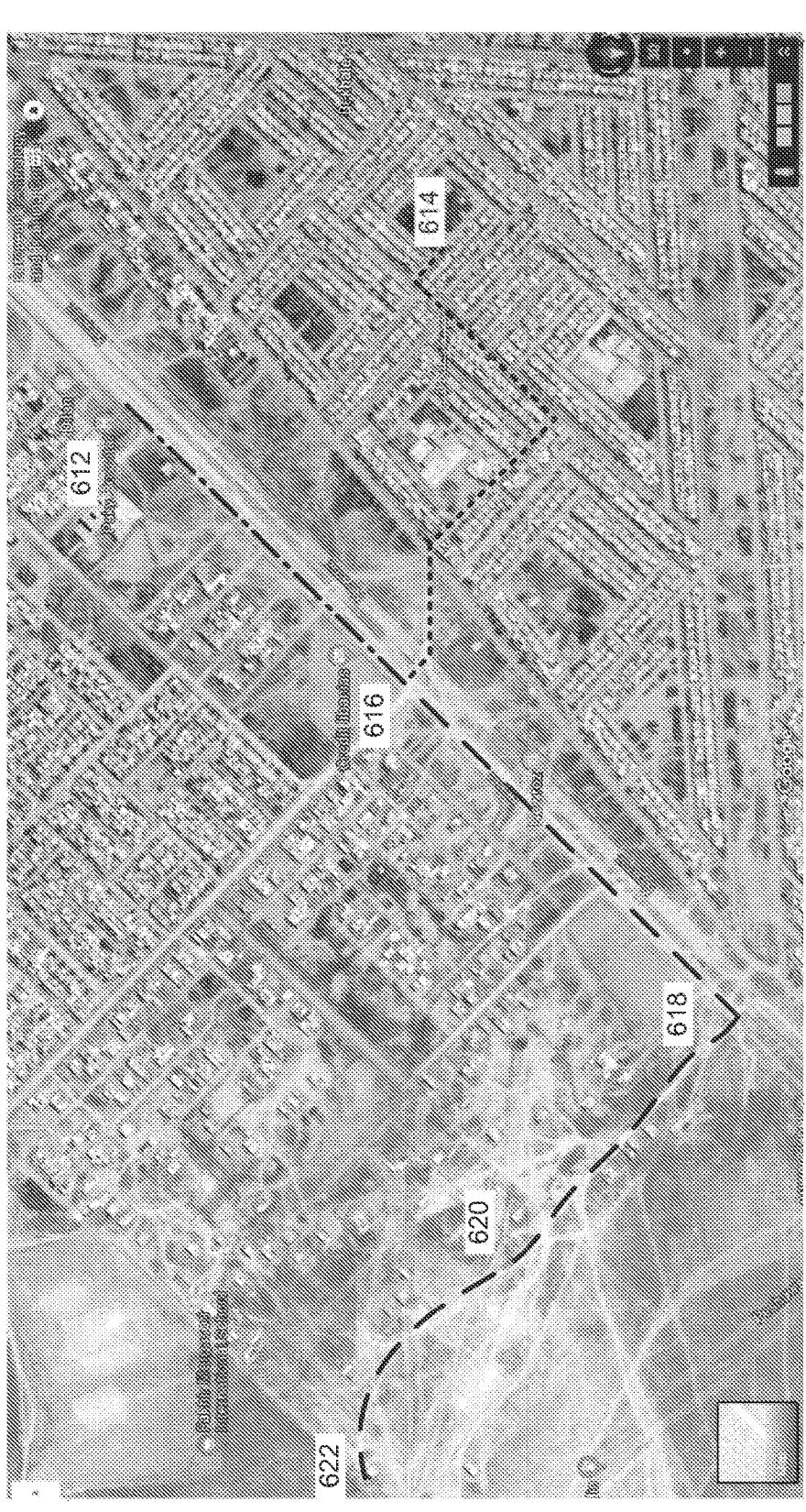

FIGS. 6C and 6D illustrate additional examples or a rural area, as described herein. More specifically, FIG. 6C illustrates a road map for a populated area. As shown, only the main roads are marked with a name and several minor roads or paths are unmarked and/or unnamed. FIG. 6D is a satellite image of the same geographic location that is illustrated in FIG. 6C. As shown, the network of unmarked and/or unnamed roads or paths service a densely populated area. Because none of the dwellings have a government-recognized house number and because the unnamed roads are not publicly maintained, FIGS. 6C and 6D depict a rural area. The figures have been annotated with reference numbers for ease of discussion below.

FIG. 7 illustrates method 700, a method for creating a global address in the form of a QR code, as described above. At step 702, the system receives at least one text string describing navigational directions from a first location to a second location. The received text string might comprise one or more navigational directions: "3 km east to red roof church turn west," "follow riverbed to falls turn north," or "from [GPS Location A] travel 1 km to [GPS Location B] following dirt path." As described above, the input text may include a commonly-used navigational direction. For example, the for the navigational direction "turn left on the path in 100 meters," the input text may read "tlop100m."

At step 704, the system analyzes the received text string(s) to determine a mode for the QR code. As described above, the QR code standard has four modes for encoding text: numeric, alphanumeric, byte, and Kanji. Each mode encodes the text as a string of bits, but each mode uses a different method for converting the text into bits. If the input string only consists of decimal digits (0 through 9), the system will select numeric mode. Alphanumeric mode is selected for input strings having decimal digits 0 through 9, as well as uppercase letters (not lowercase) and symbols $ (dollar symbol), % (percent symbol), * (asterisk), + (addition symbol), − (dash or subtract symbol), (period),/(slash), (colon), and a blank space. Byte mode is used when an alphanumeric character that can be encoded in ISO 8859-1 and is not included in the list above. If all of the characters are in the Shift JIS character set, use Kanji mode. The alphanumeric mode would be selected for three example directions provided above, but in an embodiment, the directions will include numbers only, where specific number sequences encode words like East, turn, km, etc. In such embodiments, the numeric mode could be used, so long as the system hardware components are configured to decode the number sequences.

At step 706, the system determines the amount of data required for the QR code based on the input text string and the determined mode. As provided above, each of the modes have different data requirements: numeric mode may contain up to 7,089 characters per QR code; alphanumeric mode may contain up to 4,296 characters; byte mode may contain up to 2,953 characters per QR code; and kanji mode may contain up to 1,817 characters per QR code.

At step 708, the system determines the smallest or minimum size (or version) for the QR code. As described above, the result of this step is a string of bits that is split up into data code words that are each 8-bits long. The QR code size may range from 21 pixels by 21 pixels up to 177 pixels by 177 pixels. Because the QR code may be implemented or printed on an envelope, package, business card, paper, etc., the system may be configured to select the smallest QR code to fit the received input text string. In an embodiment, the system may determine that more than one QR code is necessary to encode the received input text. In such instances, the multiple QR codes may create different size (version) QR codes or they multiple QR codes may be created using the same size (version).

At step 710, the system determines which error correction level will be used. As explained above, the global address may be encoded into QR codes having error correction values ranging from 7-30%, based on the desired accuracy, available data, or other factors. Higher levels of error correction, i.e., more code words to ensure better accuracy, requires more data. For example, in a QR code to be encoded to version 40 (177×177 pixels) using alphanumeric mode, the input text string can include up to 4,296 characters with a 7% error correction value or up to 1,852 characters with a 30% error correction value. The system may determine the error correction value based on the available block spaces in the determined minimum size. In an embodiment, the system may be configured to select a specified error correction value. For example, the system may automatically select a 30% error correction value to ensure the most accuracy.

At step 712, the system converts the input text string, error correction code words, a character count indicator, any padding bits, and/or any encryption keys into 8-bit code words and further assigns the 8-bit code words into blocks of data. The system may further assign the blocks of data into groups of blocks. For example, in an embodiment, a first block of data may contain 16 8-bit code words and a second block of data may contain an additional 16 8-bit code words. Group 1, may comprise the first and second blocks of data, thus comprising 32 8-bit code words. Returning to the example text strings provided above, the system will convert each character of each direction into 8-bit binary code words.

At step 714, the system determines the number, size, and placement of one or more finder patterns, separator patterns, alignment patterns, timing patterns, and dark blocks within a QR-code matrix (the "standard patterns"). Finder patterns are square patterns placed in one or more of the corners of the QR code. For example, finder patterns may be placed at the top left corner, top right corner, and bottom left corner of the QR code. The separator patterns are areas of whitespace that abut the finder patterns. Alignment patterns are similar to finder patterns, but smaller, and are placed throughout the code. The number and position of the alignment patterns are determined based on QR code version (size). Larger QR codes require more alignment patterns. Timing patterns are dotted lines that connect the finder patterns. Dark blocks are a single black blocks that may be placed beside the bottom left finder pattern.

At step 716, the system adds one or more of the standard patterns (finder patterns, separator patterns, alignment patterns, timing patterns, and dark blocks) to the QR-code matrix.

At step 718, the system adds, or places, the data bits starting at the bottom-right of the matrix and proceeding upward in a column that is two blocks wide. As described above, the code words, describing the input text, have been converted into binary form. Blocks representing binary zero (or null) are shaded white, whereas blocks representing binary one are shaded black or any other color that is distinguishable from white. When the first two-module column is encoded to the top of the column, a second two-module column, immediately to the left of the first column and places the blocks from top to bottom. Whenever the current column reaches the edge of the matrix, the system moves on to the next two-module column and changes direction. That is, if the system placed the blocks from top-to-bottom in the previous column, the system will place the blocks from bottom-to-top in the next column. When a finder pattern, separator pattern, alignment pattern, timing pattern, and/or dark module is encountered, the data bit is placed in the next unused location within the QR-code matrix. When a timing pattern is reached, the system will continue placing the blocks in the column to the left of the timing pattern. No column should overlap the timing pattern.

At step 720, the system determines whether any additional data masking, bit-flipping, or an encryption scheme should be applied. A mask pattern changes which blocks are dark and which are light according to a particular rule. The purpose of this step is to modify the QR code to make it easier for a QR code reader to scan and to improve scan accuracy and/or to obfuscate the encoded data. If a module in the QR code is "masked," this means that if it is a light module, based on the code word, it should be changed to a dark module. Alternatively, if the module is a dark module, it should be changed to a light module. Masking simply means to toggle the color of the module. Masking is only applied to code words (data blocks and error-code blocks) and are not applied to finder patterns, separator patterns, alignment patterns, timing patterns, and/or dark blocks. An encryption scheme, e.g., a hash function, may be applied to further scramble the bits/blocks so a third party cannot scan the code, only optical scanners that are configured to decode the specific encryption techniques. The resulting global address QR code includes the encoded text input strings that can be decoded without the aid or the internet or another data network.

At step 722, the system performs the determined data masking, bit-flipping, or encryption scheme to the QR-code matrix and finalizes the QR-code.

The ability to decode the input text strings, i.e., the navigational data, is an improvement over conventional techniques. Currently, when a person encounters a QR code, using a smartphone or other similar device, the user may scan the QR code. However, to access the content of the QR code, the device is directed to an internet site or must otherwise download content using a cellular data network or some other internet interface. In rural, remote, nomadic, or adventure locations, there is no way for a user to access the internet to retrieve the desired information. The current methods and systems overcome that technological problem because the comprehensive navigational instructions are encoded into the QR code and can be decoded without requiring a data connection, so long as the user has a compatible QR-code scanner.

Various example, non-limiting embodiments, of methods for implementing the disclosed methods and systems shall now be discussed.

In an embodiment, a user may access the system, using the internet or any other type of data network, and request a global address QR code to ship a package to a remote, rural, nomadic, or adventure location that is located outside of current mail carrier coverage, a location that is not accessible using publicly-maintained roadways, and/or a location that is outside a cellular data network. In an embodiment, such as the embodiment depicted in FIG. 6D, the user may draw a desired delivery route on the map. After the system creates a QR code, using the methods described herein, the requesting user may print the created QR code and affix the global address QR code to the package. The package may be shipped using conventional methods, e.g., FedEx, USPS, UPS, etc., to a warehouse, such as warehouse 598 as illustrated in FIG. 5. At the warehouse, the global address QR code affixed to the package is scanned using an optical scanner. In embodiments where the global address has been encoded onto a card, the global address may be decoded using magnetic stripe reader, an EMV chip reader, an RFID reader, or any other system configured to decode the global address. Without the aid or the internet or any other cellular data network, the optical scanner/reader decodes the global address QR code and determines the navigational directions for delivering the package to the specified location. The delivering user, may then coordinate delivery to the location. The delivery method may be selected by the requesting user, by the system, or by the delivering user at the warehouse. The delivery method may be selected based on the terrain, location, distance, local laws, or other factors that may affect delivery.

As described above, publicly-maintained roads may be used for at least a portion of the delivery and the encoded navigational instructions may begin at a known landmark. For example, both delivery routes illustrated in FIG. 6D begin at a hospital 612 and end at either delivery location 614 or delivery location 622. However, the delivering user may only travel on publicly-maintained roads until the user reaches intersections 616 and/or 618. Beyond those intersections, the roads and/or paths are no longer named and are no longer publicly-maintained. Using conventional methods (i.e., named roads and house numbers), the delivering user would be unable to travel any further. Without road names, road signs, house numbers, and without a cellular data connection, the delivering user would not have a reference point to gauge progress or to make the correct turn-by-turn steps. The delivering user may easily become lost and disoriented which is inefficient and costly.

Using the methods described herein, when the delivering user reaches the end of the publicly-maintained roadway at intersections 616 and/or 618, the user may again scan the QR code. At intersection 618, the delivering user has at least six dirt paths to choose from, if the wrong path is chosen, the user may become lost. However, the QR code contains an instruction to turn north-west onto a dirt path and travel toward GPS location 36°09'53.2"N 43°58'10.1"E. When the delivering user arrives at the indicated GPS location, the user may scan the same (or a different) QR code to obtain the next direction. The delivering user then traverses additional instructions traveling over other paths and passed additional landmarks 620, until reaching delivery location 622. Using the methods described herein, the delivering user does not have to rely on conventional methods, rather, the user can obtain each step-by-step direction that has been encoded into the QR code(s) affixed to the package. Further, using the methods described herein, delivery services may be provided to geographic areas, such as the geographic areas depicted in FIGS. 6A-6D, that are not serviced by conventional service providers.

In an additional implementation, a user planning a vacation or business trip to a remote location may request a global address QR code based on the user's specific itinerary. For example, the user may create a QR code that contains encoded navigational directions for traveling from the airport to a hotel. The user may also request unique QR codes that contain encoded navigational directions for traveling to and from the hotel and other local destinations such as a restaurant, an office building, etc. Such an implementation his may be useful, for users that do not speak the local language or cannot otherwise convey directions to a driver, e.g., a taxicab. A user that is planning a fishing vacation in a remote area of Alaska, may access the system, using the internet or any other type of data network, and request a global address QR code for travel directions from the airport to the fishing lodge, for travel directions from the fishing lodge to/from a local outfitter, etc. Using this implementation, the user will not have to rely on a data network to receive navigational instructions to relocate from one place to another.

In an additional implementation, an employee or employer that manages a job site in a remote, rural, nomadic, or adventure location may request QR codes that contain encoded navigational directions from that specific job site to other specific locations. The user may create one or more global address QR codes to include navigational data for traveling to/from that specific job site to an emergency location, housing compound, a communication station, or any other employer- or employee-specific location. For example, an employer that operates and oil rig in a remote or rural location that is outside of the publicly maintained transportation network and/or is outside a cellular data network, where the employees at the job site are unable to search the internet for directions, may create QR codes according to methods and systems described herein. So, if an employee is injured on the job site, navigational instructions to the nearest hospital or emergency evacuation site are readily available. Or, if an employee is unfamiliar with the area and cannot use the internet to find directions, QR codes assist the user in finding housing, communication buildings, etc. may be desired. Alternatively, the employer may create a QR code and share it with emergency response organizations/personnel. In such an embodiment, an ambulance company may store the QR code and, in the event of an emergency, scan the QR code to access the specific job site.

In an additional embodiment, the delivery location may include a beacon/emitter to assist an emergency responder, or a user that is otherwise attempting to access the delivery location, to find the location. In such an embodiment, the beacon may be an infrared beacon that continuously emits infrared signals in all directions. The signals coming from the beacon are detected by one or more IR receivers. Based on the strength and direction of the received IR signals, the system can determine the position of the beacon. In some cases, the location of the IR beacon may be determined using triangulation methods. The infrared beacon and one or more IR receivers may be used in conjunction with navigational data decoded from a QR code, as described above, and may be used to provide an added measure of confidence that a user is accessing the correct location. The beacon may be used independent of the QR code methods described herein.

It is to be understood that the above description is included to illustrate the operation of the preferred embodiments and is not meant to limit the scope of the invention. From the above discussion, many variations will be apparent to one skilled in the art that would yet be encompassed by the spirit and scope of the present invention.

What is claimed is:

1. A computer-implemented method comprising:

determining, based on object class detection applied to raster data that indicates a target location, travel instructions to access the target location from a first location;

generating, based on code words indicative of the travel instructions, a machine-readable optical image encoded with representations of the code words;

modifying the machine readable optical image based on at least one of a data mask applied to the machine readable optical image, a bit-flipping scheme applied to the machine readable optical image, or binary values applied to pixels of the machine readable optical image; and sending, to a device, an indication of the target location and the modified machine-readable optical image.

2. The computer-implemented method of claim 1, wherein the determining the travel instructions to access the target location further comprises:

receiving an indication of the target location comprising a latitude value for the target location and a longitude value for the target location;

identifying, based on the object class detection, a plurality of pixels of the raster data;

determining, for each pixel of the plurality of pixels, a respective latitude value and a respective longitude value; and determining the travel instructions to access the target location based on the latitude value for the target location, the longitude value for the target location, the respective latitude value for each pixel of the plurality of pixels, and the respective longitude value for each pixel of the plurality of pixels.

3. The computer-implemented method of claim 1, further comprising:

causing, based on the sending the indication of the target location and the modified machine-readable optical image to the device, the device to decode the machine-readable optical instructions and output the travel instructions.

4. The computer-implemented method of claim 3, wherein the modified machine-readable optical image further comprises an error-correction code word that enables the device to locate and correct an error in at least a portion of the travel instructions caused by the decode.

5. The computer-implemented method of claim 1, further comprising:

receiving, based on an interaction with an interactive map displayed on a user interface of another device, positioning information for the target location;

determining, based on a comparison of the positioning information and the raster data, that the target location is inaccessible via a publicly maintained thoroughfare; and updating the travel instructions to include an indication that the target location is inaccessible via the publicly maintained thoroughfare.

6. The computer-implemented method of claim 5, wherein the positioning information indicates at least one of latitude information associated with a landmark, longitude information associated with the landmark, or altitude information associated with the landmark.

7. The computer-implemented method of claim 1, wherein the device comprises an emergency response device, wherein an interaction with the modified machine-readable optical image facilitates a response to an emergency event by the emergency response device.

8. A non-transitory computer-readable medium having instructions stored thereon that, when executed by at least one computing device, cause the at least one computing device to perform operations comprising:

determining, based on object class detection applied to raster data that indicates a target location, travel instructions to access the target location from a first location;

generating, based on code words indicative of the travel instructions, a machine-readable optical image matrix barcode encoded with representations of the code words;

modifying the machine-readable optical image based on at least one of a data mask applied to the machine-readable optical image, a bit-flipping scheme applied to the machine-readable optical image, or binary values applied to pixels of the machine-readable optical image; and sending, to a device, an indication of the target location and the modified machine-readable optical image.

9. The non-transitory computer-readable medium of claim 8, wherein the determining the travel instructions to access the target location further comprises:

receiving an indication of the target location comprising a latitude value for the target location and a longitude value for the target location;

identifying, based on the object class detection, a plurality of pixels of the raster data;

determining, for each pixel of the plurality of pixels, a respective latitude value and a respective longitude value; and determining the travel instructions to access the target location based on the latitude value for the target location, the longitude value for the target location, the respective latitude value for each pixel of the plurality of pixels, and the respective longitude value for each pixel of the plurality of pixels.

10. The non-transitory computer-readable medium of claim 8, the operations further comprising:

causing, based on the sending the indication of the target location and the modified machine-readable optical image to the-user device, the device to decode the machine-readable optical image and output the travel instructions.

11. The non-transitory computer-readable medium of claim 10, wherein the modified machine-readable optical image further comprises an error-correction code word that enables the device to locate and correct an error in at least a portion of the travel instructions caused by the decode.

12. The non-transitory computer-readable medium of claim 8, the operations further comprising:

receiving, based on an interaction with an interactive map displayed on a user interface of another device, positioning information for the target location;

determining, based on a comparison of the positioning information and the raster data, that the target location is inaccessible via a publicly maintained thoroughfare; and updating the travel instructions to include an indication that the target location is inaccessible via the publicly maintained thoroughfare.

13. The non-transitory computer-readable medium of claim 12, wherein the positioning information indicates at least one of latitude information associated with a landmark, longitude information associated with the landmark, or altitude information associated with the landmark.

14. The non-transitory computer-readable medium of claim 8, wherein the device comprises an emergency response device, wherein an interaction with the modified computer-readable optical image facilitates a response to an emergency event by the emergency response device.

15. A system comprising:

a memory; and at least one processor coupled to the memory and configured to perform operations comprising:

determining, based on object class detection applied to raster data that indicates a target location, travel instructions to access the target location from a first location;

generating, based on code words indicative of the travel instructions, a machine-readable optical image encoded with representations of the code words;

modifying the machine-readable optical image based on at least one of a data mask applied to the machine-readable optical image, a bit-flipping scheme applied to the machine-readable optical image, or binary values applied to pixels of the machine-readable optical image; and sending, to a device, an indication of the target location and the modified machine-readable optical image.

16. The system of claim 15, wherein the determining the travel instructions to access the target location further comprises:

receiving an indication of the target location comprising a latitude value for the target location and a longitude value for the target location;

identifying, based on the object class detection, a plurality of pixels of the raster data;

determining, for each pixel of the plurality of pixels, a respective latitude value and a respective longitude value; and determining the travel instructions to access the target location based on the latitude value for the target location, the longitude value for the target location, the respective latitude value for each pixel of the plurality of pixels, and the respective longitude value for each pixel of the plurality of pixels.

17. The system of claim 15, the operations further comprising:

causing, based on the sending the indication of the target location and the modified machine-readable optical image to the device, the device to decode the machine-readable optical image and output the travel instructions.

18. The system of claim 17, wherein the modified machine-readable optical image further comprises an error-correction code word that enables the user device to locate and correct an error in at least a portion of the travel instructions caused by the decode.

19. The system of claim 15, the operations further comprising:

receiving, based on an interaction with an interactive map displayed on a user interface of another device, positioning information for the target location;

determining, based on a comparison of the positioning information and the raster data, that the target location is inaccessible via a publicly maintained thoroughfare; and updating the travel instructions to include an indication that the target location is inaccessible via the publicly maintained thoroughfare.

20. The system of claim 15, wherein the device comprises an emergency response device, wherein an interaction with the modified machine-readable optical image facilitates a response to an emergency event by the emergency response device.

\* \* \* \* \*